United States Patent
Kiser et al.

(10) Patent No.: US 6,738,049 B2
(45) Date of Patent: May 18, 2004

(54) IMAGE BASED TOUCHSCREEN DEVICE

(75) Inventors: Willie C. Kiser, Albuquerque, NM (US); Jason M. Hoy, Albuquerque, NM (US)

(73) Assignee: Aquila Technologies Group, Inc., Albuquerque, NM (US)

( * ) Notice: Subject to any disclaimer, the term of this patent is extended or adjusted under 35 U.S.C. 154(b) by 222 days.

(21) Appl. No.: 09/847,445

(22) Filed: May 1, 2001

(65) Prior Publication Data

US 2001/0035859 A1 Nov. 1, 2001

Related U.S. Application Data

(60) Provisional application No. 60/203,251, filed on May 8, 2000.

(51) Int. Cl.[7] ................................................. G09G 5/00
(52) U.S. Cl. ........................................ 345/173; 345/172
(58) Field of Search ................................ 345/352, 173, 345/334, 864, 863, 349, 348, 965, 156, 159; 395/166; 434/29, 30, 49; 463/25

(56) References Cited

U.S. PATENT DOCUMENTS

| | | | |
|---|---|---|---|
| 5,070,467 A | * 12/1991 | Todome | 345/502 |
| 5,224,861 A | 7/1993 | Glass et al. | |
| 5,428,367 A | 6/1995 | Mikan et al. | |
| 5,632,622 A | 5/1997 | Bothwell | |
| 5,739,814 A | * 4/1998 | Ohara et al. | 345/173 |
| 5,793,368 A | * 8/1998 | Beer | 345/747 |
| 5,818,450 A | * 10/1998 | Katsuta | 345/840 |
| 5,982,352 A | 11/1999 | Pryor | |
| 6,225,976 B1 | * 5/2001 | Yates et al. | 345/156 |
| 6,236,399 B1 | * 5/2001 | Nishiyama et al. | 345/810 |
| 6,331,867 B1 | * 12/2001 | Eberhard et al. | 345/864 |
| 6,433,801 B1 | * 8/2002 | Moon et al. | 345/840 |
| 6,506,118 B1 | * 1/2003 | Baerlocher et al. | 463/25 |
| 2003/0052921 A1 | * 3/2003 | Ulrich et al. | 345/765 |

OTHER PUBLICATIONS

"SurfTouch—Touch Screen Web Browser." Apr. 24, 2000. <http://www.surftough.com/index.html>.

(List continued on next page.)

*Primary Examiner*—Vijay Shankar
*Assistant Examiner*—Nitin Patel
(74) *Attorney, Agent, or Firm*—David W Carstens; Carstens Yee & Cahoon, LLP (57) ABSTRACT

An improved auxiliary input device for use with various computer applications which is more versatile and easier to use than prior devices. A touchscreen device is used to provide easier inputs to the computer applications. The layout of the touchscreen display may be customized using layout software that maps visual indicators on the touchscreen to user-defined key sequences, mouse events, external calling of Dynamic Link Libraries, URL links, or other miscellaneous actions. Control software runs in the background for loading the saved layout configurations and executing the user-defined key sequences or mouse events whenever the touchscreen is touched by the user. The control software can be configured to automatically load layouts based on the active program or game being played. The touchscreen configuration for each game may be programmed with bitmaps and key sequences and then stored for later retrieval. In order to provide rapid retrieval of a configuration, the touchscreen device is connected to the system through the USB port rather than the keyboard port. Once a layout is loaded onto the touchscreen display, the input device senses pressure on the integral touchscreen. Whenever pressure is sensed, the touchscreen display sends a signal back to the computer through the USB port, and the computer microprocessor executes the key sequence or other command associated with the location on the touchscreen that was pressed. Each location or area on the touchscreen is mapped to an entry in the user-defined table created using the layout editor.

26 Claims, 10 Drawing Sheets

OTHER PUBLICATIONS

"Touch Screen Programs." Apr. 24, 2000. Econo Touch Inc. <http://www.econotouch.com/surftouch.htm>.

"via touchpanel." Apr. 5, 2000. ELAN Home Systems. <http://www.elanhomesystems.com/via.htm>.

"Screen Technology." Apr. 24, 2000. Econo Touch Inc. <http://www.econotouch.com/tech/STech.htm>.

"Cyborg 3D Pad." Apr. 25. 2000. <http://www.saitekusa.com/products/other/pcdash.html>.

"The Reviewboard Magazine—Computer Peripherals—MasterPilot Value Pak—Quickshot." Apr. 25, 2000. <http://www.reviewboard.com/index.html?article=98>.

* cited by examiner

IMAGE BASED TOUCHSCREEN DEVICE

RELATED APPLICATIONS

This application claims the benefit, under 35 U.S.C. §119(e)(1), of U.S. Provisional application Serial No. 60/203,251, filed May 8, 2000, which is incorporated herein by this reference.

BACKGROUND OF THE INVENTION

1. Technical Field

The present invention relates to a touchscreen controller, and more particularly to a touchscreen controller to be used for computer application programs wherein the touchscreen controller may be programmed to create custom layouts for the application programs.

2. Description of the Related Art

Computer games have become increasingly popular in recent years as computer technology has advanced to provide realistic gaming environments. Many of these games implement keyboard macros to enable the user to control the particular game being played. In order to make the games more user friendly, and easier to learn, additional input devices dedicated to a particular game have been developed to enable the user to simply push a button in order to run the macro that would take two or three or more keyboard strokes to run. For example, a joystick and throttle combination may be used with a flight simulator to help eliminate keyboard inputs. Other input devices may be used to provide dedicated buttons for a game. These input devices are sometimes programmable and usually require different overlay cards depending on the game being played. Presently, these programmable input devices connect inline with the keyboard and allow the user to program the buttons on the device to represent a particular keyboard sequence associated with a command for a game. The overlay card then indicates to the user what particular function a particular button on the input device performs. The overlay card may be created in conjunction with the programming of the device and simply printed to allow the user to program the input device for any game requiring keyboard inputs.

One of the problems with current auxiliary input devices such as those described above is that a new overlay must be created for each game and the overlay must be removed and replaced with a new game when the user decides to play another game. Another problem is that the input device must be manually configured by the user to change between games. It would be desirable for the input device to be more easily adaptable and versatile for the various games or other applications on the computer. In particular, an improved input device would not require an overlay card which must be changed every time a new application is started. In addition, the improved device may be set up to automatically change its configuration whenever the active application being used on the PC is changed.

SUMMARY OF THE INVENTION

The present invention provides an improved auxiliary input device for use with various computer applications which is more versatile and easier to use than prior devices. A touchscreen device is used to provide easier inputs to the computer applications. The layout of the touchscreen display may be customized using layout software that maps visual indicators on the touchscreen to user-defined key sequences, mouse events, external calling of Dynamic Link Libraries, URL links, or other miscellaneous actions. Control software runs in the background for loading the saved layout configurations and executing the user-defined key sequences or mouse events whenever the touchscreen is touched by the user. The control software can be configured to automatically load layouts based on the active program or game being played. The touchscreen configuration for each game may be programmed with bitmaps and key sequences and then stored for later retrieval. In order to provide rapid retrieval of a configuration, the touchscreen device is connected to the system through the USB port rather than the keyboard port. Once a layout is loaded onto the touchscreen display, the input device senses pressure on the integral touchscreen. Whenever pressure is sensed, the touchscreen display sends a signal back to the computer through the USB port, and the computer microprocessor executes the key sequence or other command associated with the location on the touchscreen that was pressed. Each location or area on the touchscreen is mapped to an entry in the user-defined table created using the layout editor.

DETAILED DESCRIPTION

Figure 1:
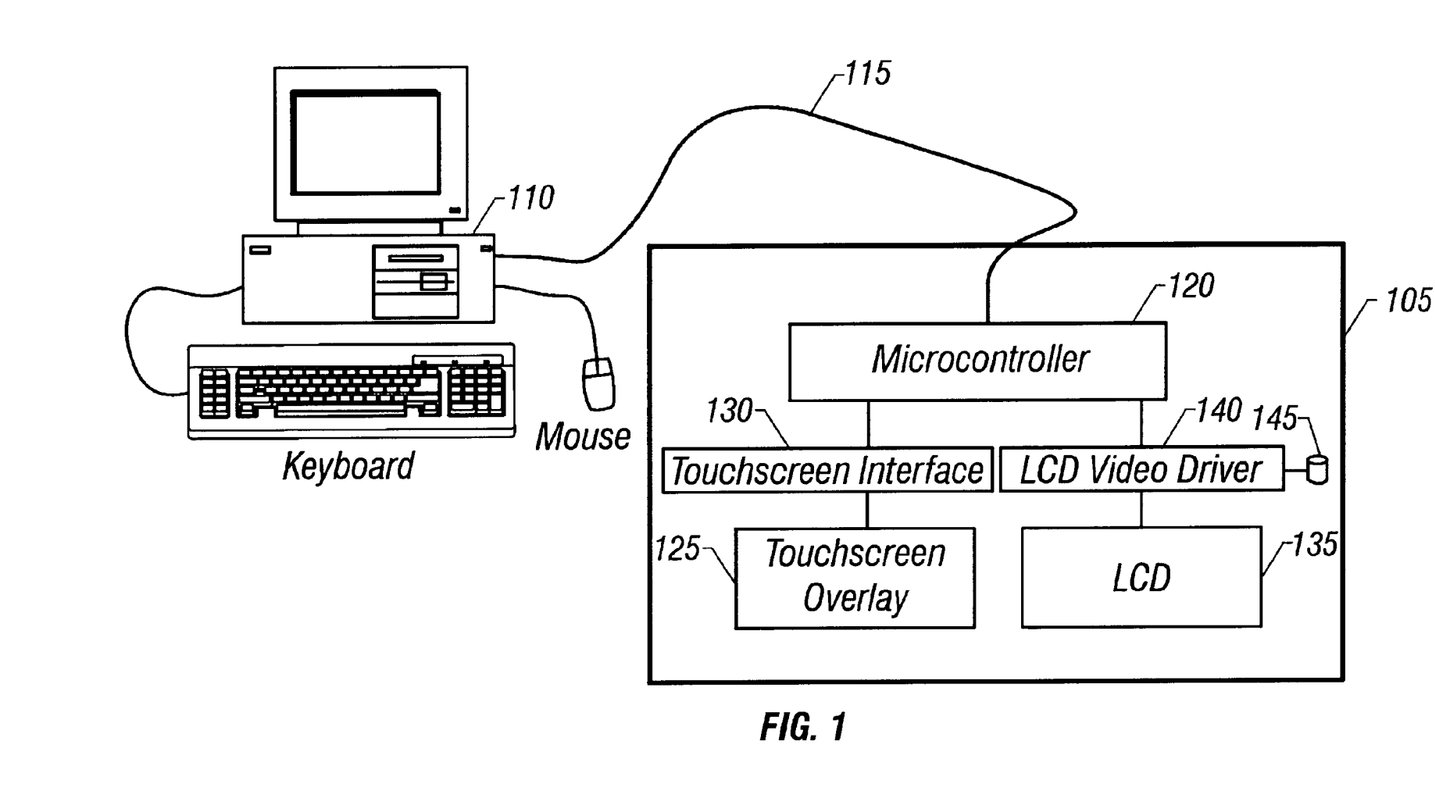
FIG. 1 is a block diagram of an embodiment of the present invention.

Referring now to FIG. 1, a block diagram of an embodiment of the present invention is illustrated. The game controller 105 is connected to the Uniform Ser. Bus (USB) of a personal computer (PC) 110 using a serial cable 115. The game controller 105 comprises a microcontroller 120 for interfacing with the PC 110 to load the images from a layout file into the game controller 105 and to transmit inputs to the PC 110. The microcontroller 120 is connected to a touchscreen overlay 125 through a touchscreen interface 130. The touchscreen overlay 125 could be a passive resistive touch sensitive panel or any touchscreen device commonly known in the art. In a preferred embodiment, the touchscreen overlay 125 is integrally connected to the Liquid Crystal Display (LCD) 135. An LCD video driver 140 is connected between the microcontroller 120 and the LCD 135. A video memory device 145 is connected to the LCD video driver 140.

In a typical operating mode, the PC 110 is booted up by the user and automatically runs the control software for the game controller 105. The control software is responsible for loading the appropriate layout file into the game controller 105 whenever a game or application is started by the user. The layout file for a particular game may be created and loaded manually by the user or the control software can be set to load a previously created layout file automatically whenever a particular game or application is started. The images from the layout file are downloaded to the microcontroller 120 via the serial cable 115. The microcontroller 120 displays the images on the LCD 135. Once the images are displayed, the microcontroller awaits a user input through the touchscreen overlay 125. Whenever a touchscreen input is received, the microcontroller 120 sends the input to the PC 110 which retrieves the user-defined action associated with that input from a table in the layout file. Once retrieved, the PC 110 performs the user-defined action.

Figure 2:
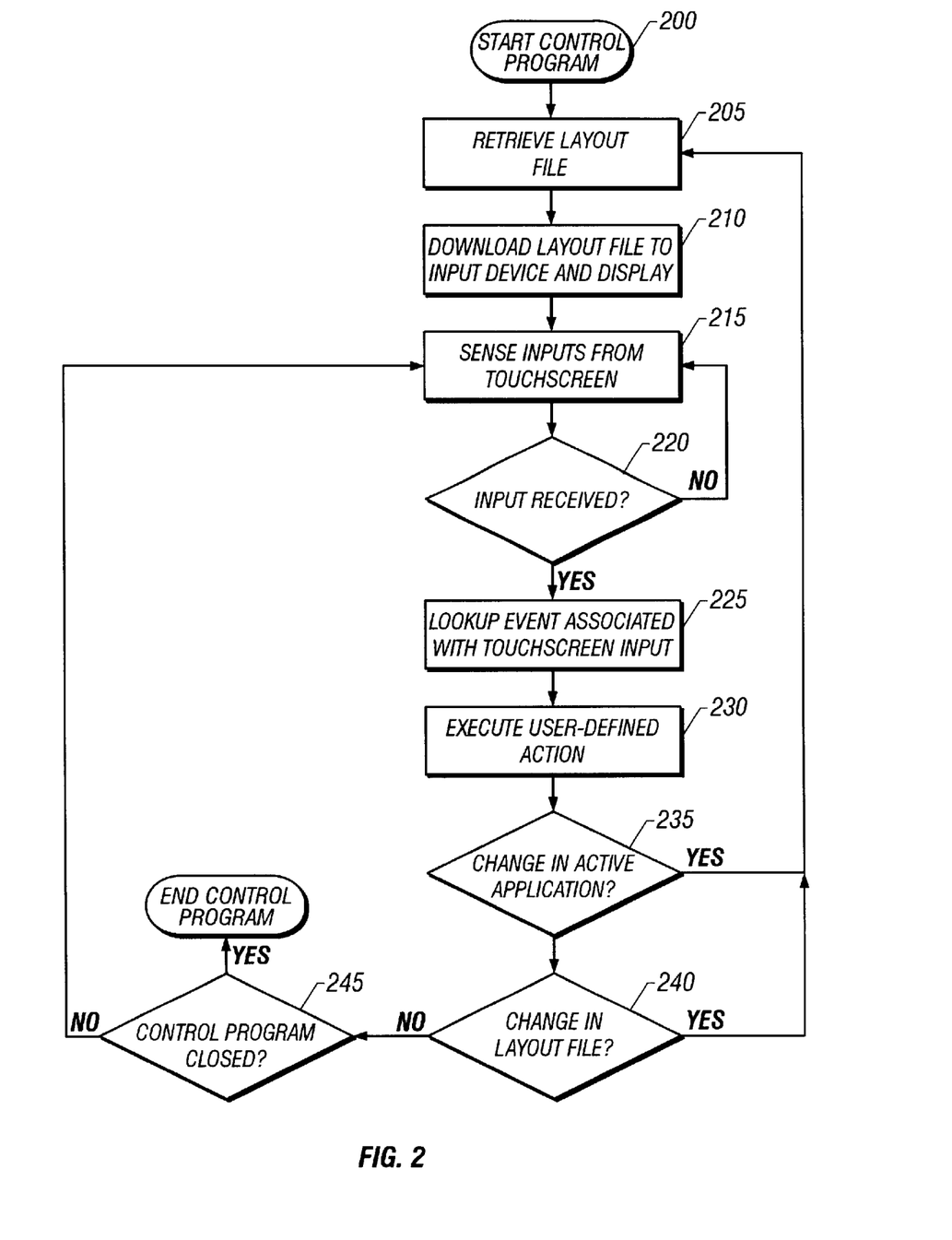
FIG. 2 is a flowchart of the control software according to an embodiment of the present invention.

Referring now to FIG. 2, a flowchart of the control software according to an embodiment of the present invention is illustrated. The control software is started at step 200 either automatically through the startup menu when the PC is booted up or manually when the user runs the program. At step 205 the layout file associated with the particular game being played is retrieved from storage on the PC. If there is no layout file available for the game, then a default layout file is retrieved. Once retrieved, the images associated with the layout file are displayed on the game controller LCD at step 210. When the images are loaded and displayed on the input device, the device is ready for inputs from the user. The integral touchscreen overlay on the LCD senses inputs from the user at step 215. Once an input is received at step 220, the microcontroller sends the location and type of touchscreen input to the PC via the USB and the PC retrieves the user-defined action associated with that input from a table in the layout file at step 225. The user-defined action is then executed by the PC at step 230. Depending on the manner in which the layout file is setup by the user, a user-defined action could be a keyboard input, a mouse input, an external call of a Dynamic Link Library (DLL), the opening of a Uniform Resource Locator (URL) or any other action that can be performed by the computer. During the time that the control software is running, the active game or application may be changed by the user. The software monitors for such a change at step 235 and can be set to automatically retrieve a different layout file by returning to step 205 when the user changes games. Furthermore, the user may choose to modify the layout file for a game while the game is being played. Whenever a layout file is changed at step 240, then the control software returns to step 205 to retrieve the newly modified file at step 205. The control software continues to operate in this manner until the computer is shut down or the program is closed down at step 245.

Figure 3:
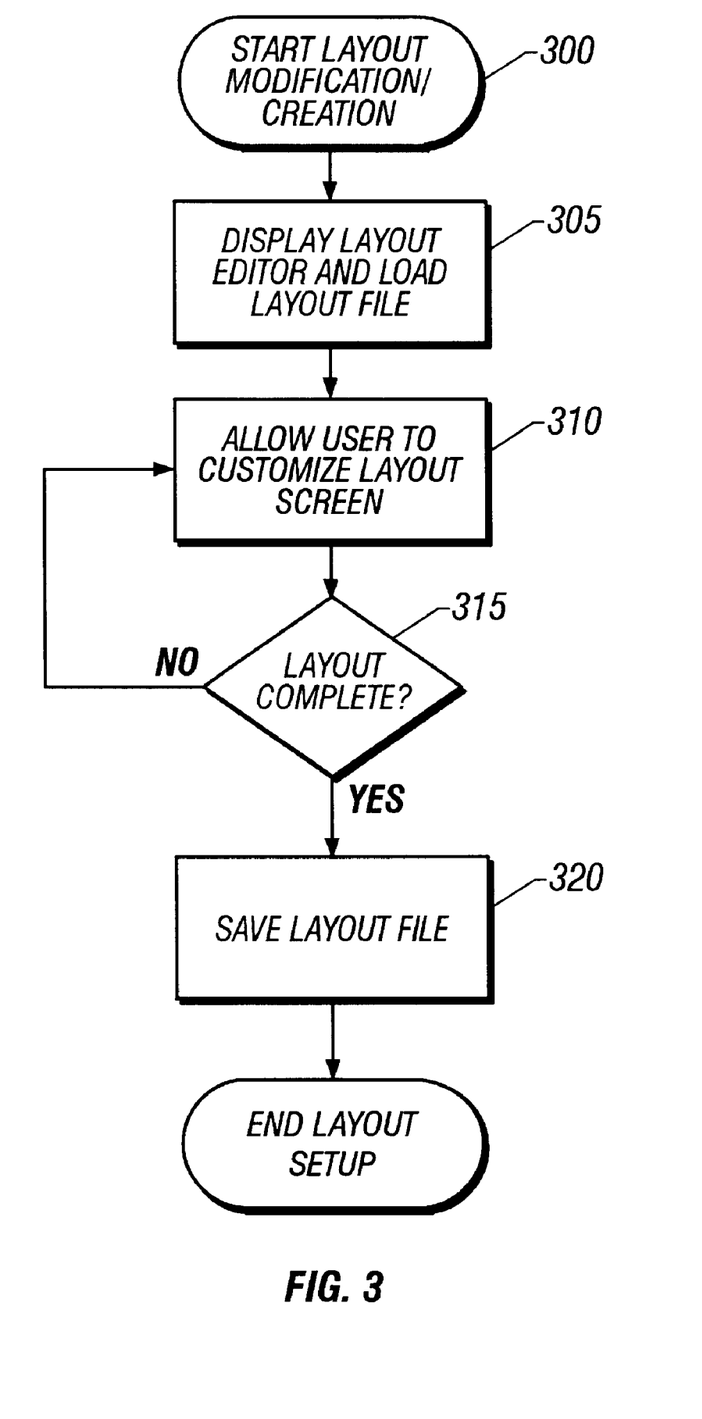
FIG. 3 is a flowchart of the layout software in accordance with an embodiment of the present invention.

Referring now to FIG. 3, a flowchart of the layout software in accordance with an embodiment of the present invention is illustrated. The layout software is used to create and/or modify the layout files to be used with various games or applications. The user can manually open the layout software whenever a layout file needs to be created or modified. When the layout software begins running, a layout editor is displayed on the PC monitor at step 305. The layout editor contains a window that represents the boundaries of the LCD on which the images within the window will be displayed when the layout file is loaded. The user is allowed to input different images into the window and, if desired, associate these images with a user-defined action at step 310. This process is repeated until the layout is complete at step 315. The user saves the layout file at step 320 so that it can later be loaded by the control software.

Figure 4:
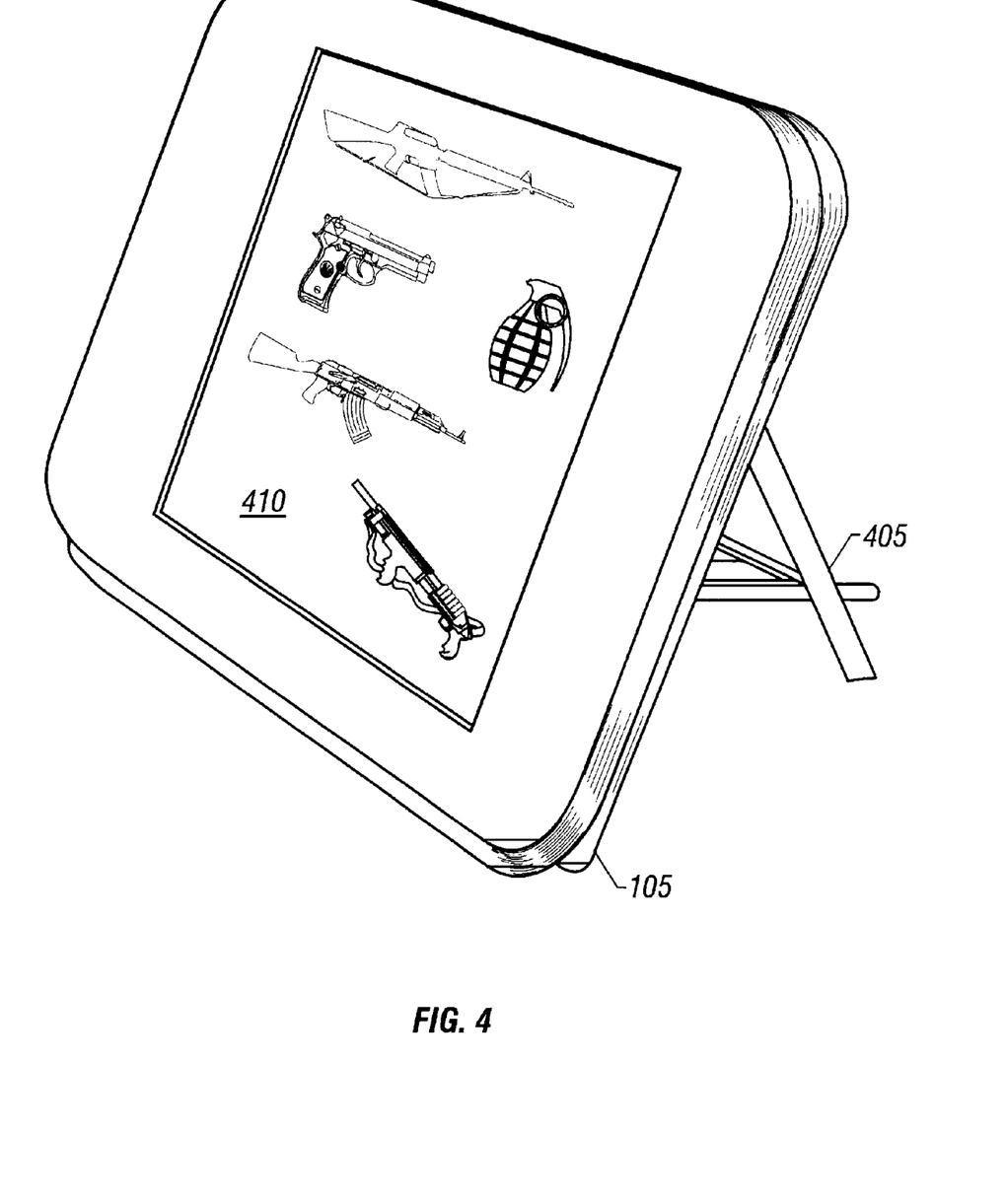
FIG. 4 is a pictorial representation of an input device in accordance with an embodiment of the present invention.

Referring now to FIG. 4, a pictorial representation of an input device in accordance with an embodiment of the present invention is illustrated. The game controller 105 contains a stand 405 that is adjustable for different viewing angles. For example, the stand can be adjusted such that the screen has a 21, 28, or 35 degree angle relative to the surface on which the game controller is placed. The game controller 105 contains a 320 by 240 color LCD 410 for displaying the images stored in a layout file. FIG. 4 shows the game controller 105 with a layout file loaded which is configured for buying items in the game Counter-Strike/Half-Life. The passive resistive touch sensitive panel 125 shown in FIG. 1 is integrated with LCD 410 such that the user may simply touch the screen to purchase a Kevlar vest, a helmet, or any of the weapons pictured on the LCD. This is merely an example of the many possible uses of the game controller 105. The game controller 105 can be used with most windows-based games and applications and the user can configure any graphics and key sequences for use with individual games or other utilities. In the example shown in FIG. 4, the various images are arranged in a custom layout file that includes a table that associates key sequences or other user-defined actions with the activation of a particular area on the layout. The images are sent to the game controller 105 through a full speed USB bus when a layout file is loaded by the control software. Each individual image is displayed on the active matrix display and the game controller senses pressure on the touchscreen. These touchscreen presses are then sent back to the computer which then executes the list of commands specified by the user-defined table in the layout editor. The height, width, and depth of the game controller 105 for a preferred embodiment are 152 mm, 191 mm, and 38 mm, respectively.

Figure 5:
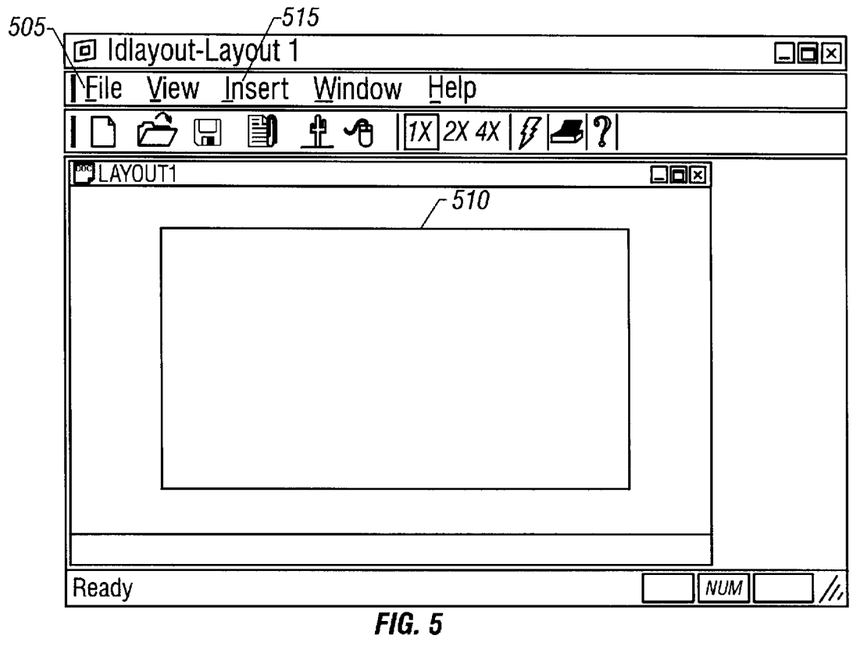
FIG. 5 is a screen shot of a layout editor in accordance with an embodiment of the invention.

Referring now to FIG. 5, a screen shot of a layout editor in accordance with an embodiment of the invention is illustrated. When the user runs the layout software described with reference to FIG. 3, the layout editor appears on the PC monitor as shown in FIG. 5. Once the layout editor is activated, the user may create a new file or open an existing file using the pull down File menu 505. The window area 510 represents the boundaries of the LCD display on the game controller 105. The user may insert images into the window 510. The images are defined by a boundary and will represent an area on the touchscreen device which is associated with a particular action that is defined by the user during the creation of the layout. To insert items into the window 510, the user selects the pull down Insert menu 515. There are three types of items that can be placed on a layout. First, a bitmap can be inserted. A bitmap is a picture that has no actions associated with it and is useful for background art or visual indicators. Secondly, a mouse pad area can be inserted into the layout. A mouse pad area is used for feeding mouse inputs into the operating system of the PC as if the actual mouse were being used. Finally, a macro can be inserted into the layout and customized to perform a specific set of actions whenever the macro is activated. The macro can also have a picture associated with it as is illustrated on the LCD 410 in FIG. 4. Whenever the user selects insert bitmap from the pull down Insert menu 515, a bitmap setup screen as shown in FIG. 6 is displayed.

Figure 6:
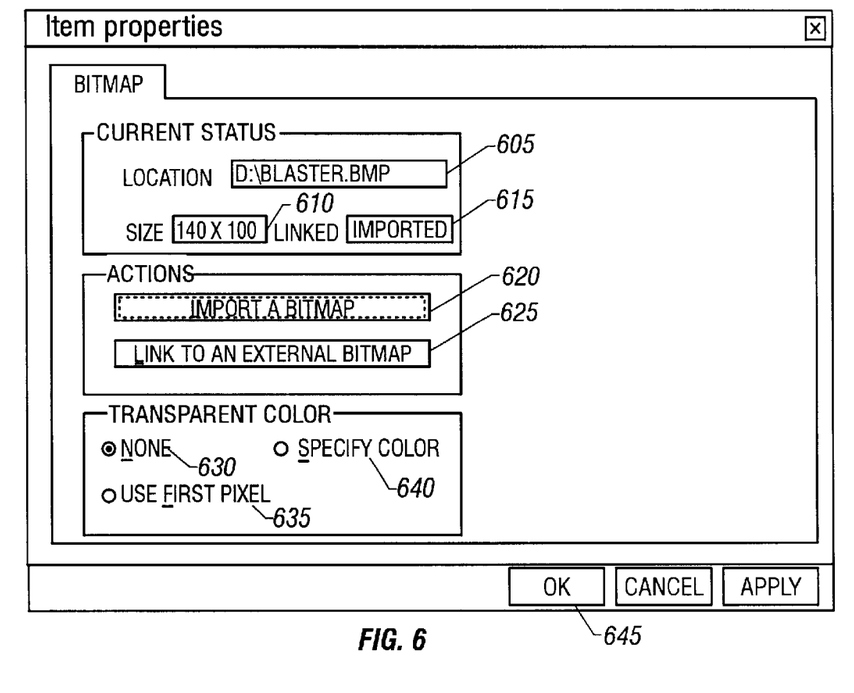
FIG. 6 is a screen shot of a screen for inserting and customizing a bitmap in accordance with an embodiment of the invention.

Referring now to FIG. 6, a screen shot of the screen for inserting and customizing a bitmap in accordance with an embodiment of the present invention is illustrated. A bitmap defines an area on the layout that would display the specified picture. Multiple types of items can have bitmaps as background to highlight the active area such as macros and mouse pads. Other types of images can be imported by using a different program to save the images as a bitmap file prior to attempting to insert the picture. The location block 605 displays the location of the bitmap file. If the file was imported, this path represents from where the file was imported. If the file is linked, then this path represents where the file will be read from when the layout is downloaded to the controller. The size block 610 displays the dimensions of the bitmap. The bitmap can be resized in the layout editor but the full bitmap is stored internally. This size represents the original size of the bitmap. The file status block 615 displays "imported" for bitmap files that are fully contained within the layout. For bitmap files that are linked, then "yes" is displayed in the status block 615. The user may click the Import a bitmap button 620 to import a bitmap to be displayed in the layout. An imported bitmap means that the image data is stored as part of the layout file. An imported bitmap is useful because once the image data is imported, the external file is no longer needed and the layout is self-contained. To save disk space, the user may choose to link the file by clicking the Link to an external bitmap button 625. All linked bitmap files must be available whenever the layout is used. A linked bitmap file is useful when there is a common bitmap used in multiple layouts. Because the image data is stored externally, only one image needs to be updated to update all layouts. The bitmap properties may also be such that a certain color in the bitmap is transparent and will not hide any colors behind the bitmap. If the None option 630 is selected, there is no transparent color for the bitmap and all of the bitmap colors will be displayed. If the Use first pixel option 635 is selected, then the first color in the bitmap will be the transparent color. Therefore, any color in the bitmap that is the same as the first pixel will be transparent. The first pixel is in the upper left hand corner of the bitmap. The user can also select the Specify color option 640 to specify the transparent color directly. Once the bitmap properties are set up, the user clicks the OK button 645 to insert the bitmap onto the layout editor shown in FIG. 5. The user can move the bitmap around or resize it within the layout editor.

Figure 7:
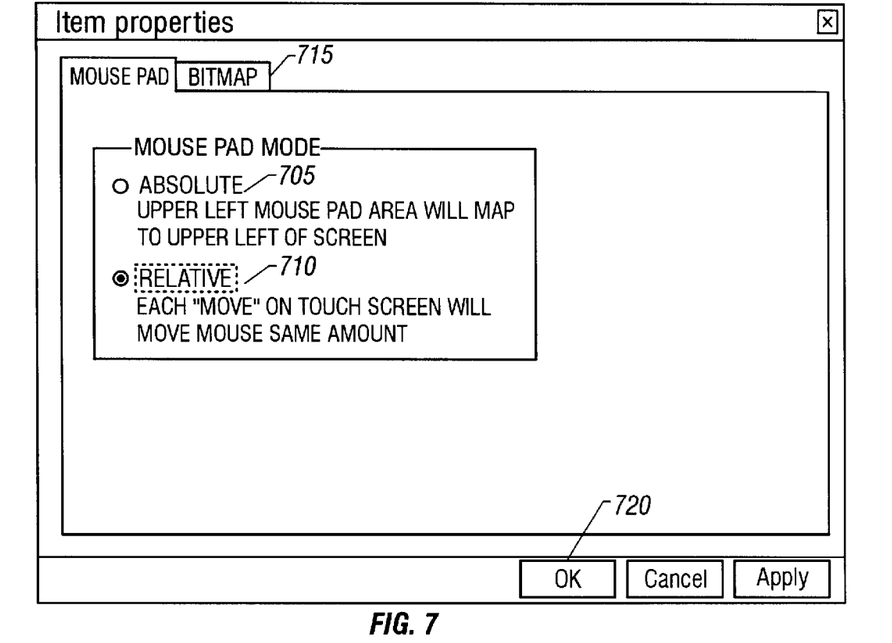
FIG. 7 is a screen shot of a screen for customizing the mouse pad area in accordance with an embodiment of the invention.

Referring now to FIG. 7, a screen shot for customizing the mouse pad area in accordance with an embodiment of the invention is illustrated. A "mouse pad" allows an area on the touchscreen display to behave like a mouse. Touching and moving a finger across the mouse pad area moves the mouse cursor on the screen of the PC. A mouse pad is useful to control the main system cursor or for moving around in a game. The mouse pad can be set to either an absolute mode or a relative mode. If the Absolute option 705 is selected, then the mouse pad area represents a miniature version of the computer screen. This means that touching the upper left hand corner of the area will move the main cursor to the upper left corner of the screen and similarly for any other area of the mouse pad. If the Relative option 710 is selected by the user, then each pixel worth of movement on the controller will map to that much movement of the main system cursor. Relative mode is like using a real mouse on a mouse pad. A bitmap may also be associated with the mouse pad area by clicking on the Bitmap button 715 to display the bitmap set-up screen illustrated in FIG. 6. The user clicks the OK button 720 to insert the mouse pad area onto the layout editor and further change the position or size of the mouse pad.

Figure 8:
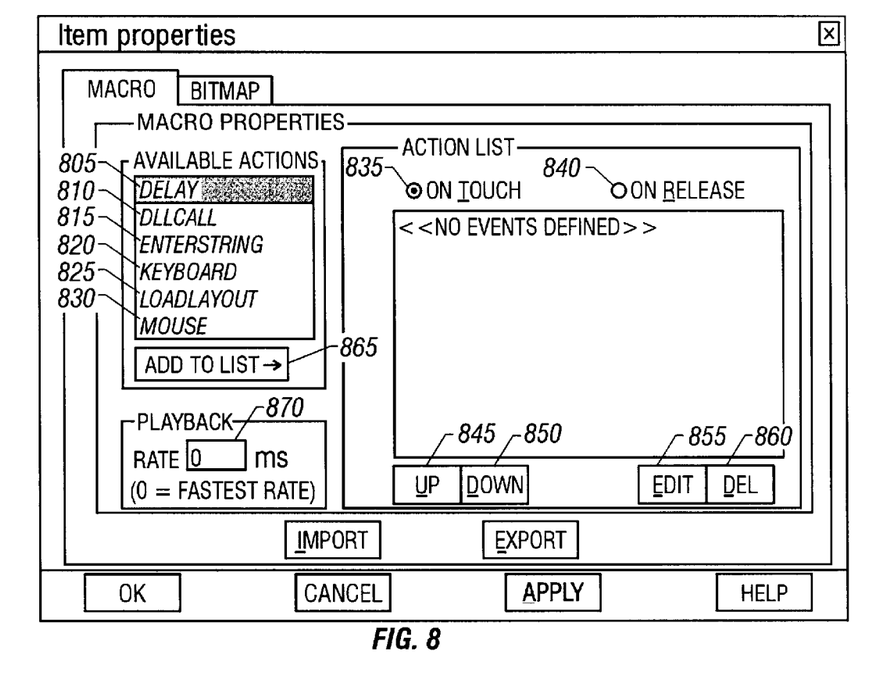
FIG. 8 is a screen shot of a screen for macro setup in accordance with an embodiment of the invention.

Referring now to FIG. 8, a screen shot of the screen for macro setup in accordance with an embodiment of the invention is illustrated. Whenever the user selects insert a macro from the pulldown Insert menu 515 shown on the layout editor of FIG. 5, the macro setup screen of FIG. 8 is displayed. A "macro" is a list of actions to perform when a touch or untouch event is received from the game controller 105 for the bounding region of the item in the layout. A touch event is received when the screen is first touched. An untouch event is received when the screen press is released. Each event can have its own list of actions to perform. Several actions can be performed using a macro. These include the delay action 805 which pauses playback of a list items for a specified amount of time. This is useful for putting in delays for processing time or if the game or application cannot receive the action too quickly. A DLLCall action 810 is used to execute a call to an external dynamic link library (DLL). The EnterString action 815 is used to enter an entire string as if it were typed on the keyboard of the PC. This saves the effort of creating a key press/release for each character. A Keyboard action 820 is used to simulate a key press or release. This is useful for mapping game keyboard commands to a graphics hot spot on the controller. A LoadLayout action 825 is used to implement a multi-page setup by loading or activating another layout. This can also be used to implement a menu system on the controller. A Mouse action 830 is used to simulate a mouse event. Either a mouse button press/release or a mouse movement can be simulated. This is useful for automating repetitive sequences. Clicking the On touch button 835, displays the actions to be executed upon a touch of the particular macro area. Clicking the On release button 840 displays the actions executed upon a release or untouch of the macro area. Clicking the Up button 845 moves the selected action up in the list while clicking the Down button 850 moves the selected action down in the list. Clicking the Edit button 855 allows the selected action to be edited. Double-clicking on an action in the list accomplishes the same thing. Clicking the Del button 860 removes the selected action from the action list. The Add to list button 865 is used to add one of the available actions on the left to the action list on the right. Actions in the list will be executed in the order listed when a touch or untouch event is received from the controller. The playback rate 870 controls how fast the action list is executed. The rate is entered in milliseconds. A zero playback rate executes the items as fast as possible while a non-zero playback inserts a delay of the specified amount between each action.

Figure 9:
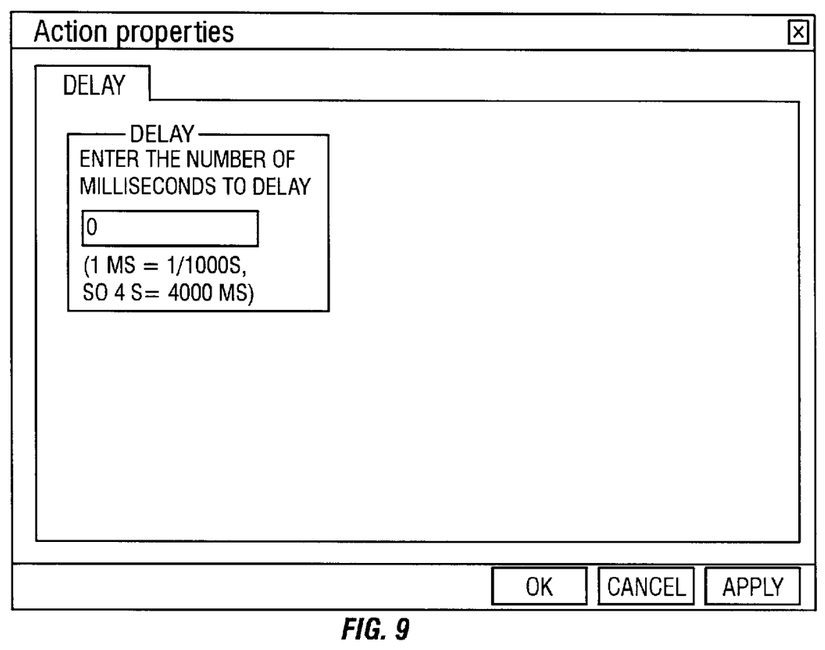
FIG. 9 is a screen shot of the action properties setup for a Delay action in accordance with an embodiment of the present invention.

Referring now to FIG. 9, a screen shot of the action properties setup for a Delay action 805 in accordance with an embodiment of the present invention is illustrated. Whenever the user clicks the Add to list button 865 while a delay action 805 is selected, the screen shown in FIG. 9 is activated. The user inserts the number of milliseconds to delay the action list prior to the execution of the next action on the list. A delay action allows an action list to be paused.

If certain actions take a long time, a delay can be used to give the action time to execute.

Figure 10:
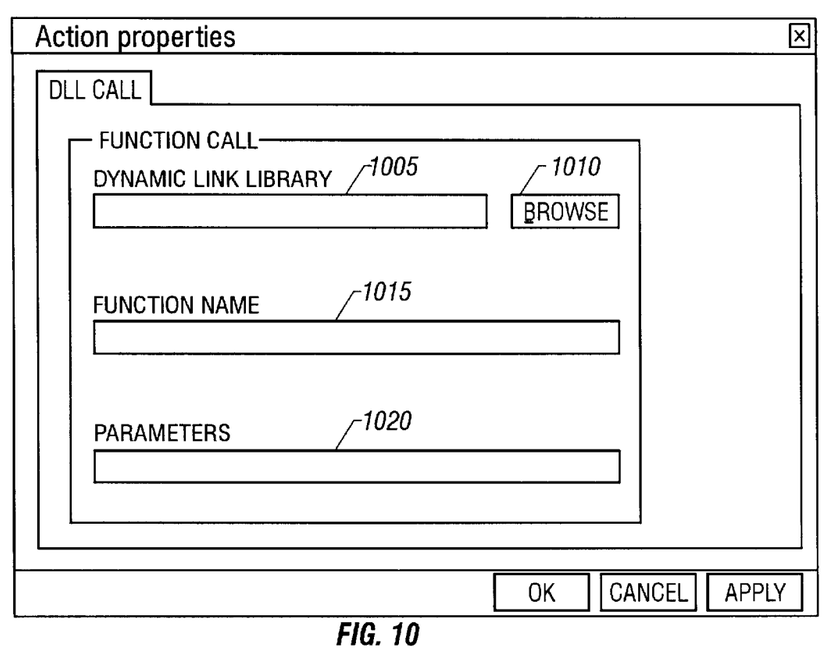
FIG. 10 is a screen shot of the action properties for a DLLCall action in accordance with an embodiment of the present invention.

Referring now to FIG. 10, a screen shot of the action properties for a DLLCall action 810 in accordance with an embodiment of the present invention is illustrated. When the user selects a DLLCall action 810 to be added to the action list using the Add to list button 865, the action properties screen shown in FIG. 10 is activated. This action makes the specified call to a dynamic link library (DLL). Such an action can be used by developers for more direct game integration. The dynamic link library block 1005 is used to specify the location of the DLL that will be called. Clicking the Browse button 1010 allows the user to browse for the DLL. The Function name block 1015 specifies the exported function name in the DLL to call. The parameters block 1020 allows the user to specify the parameters to pass to the function in the DLL.

Figure 11:
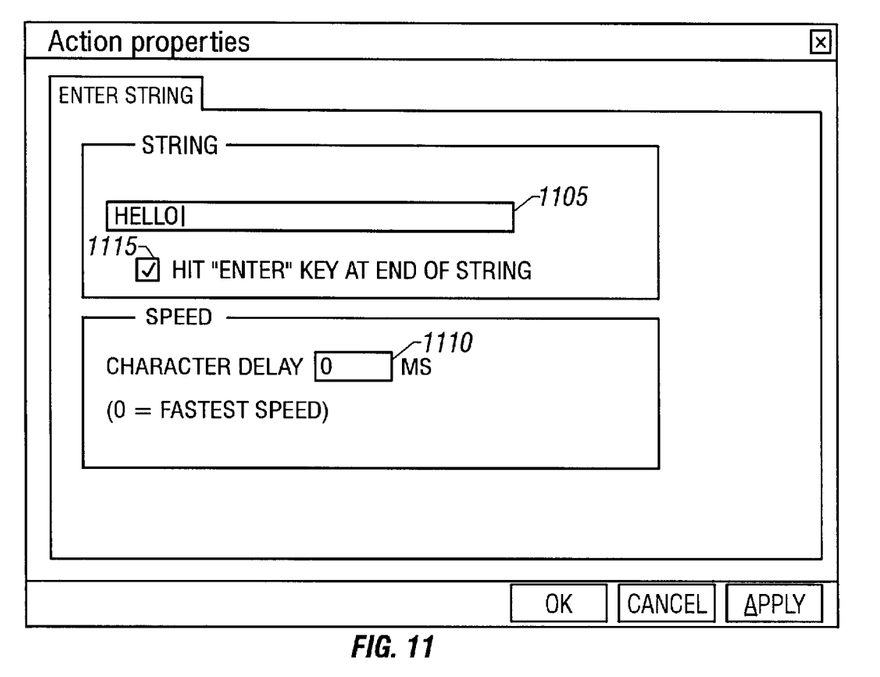
FIG. 11 is a screen shot of the action properties for an EnterString action in accordance with an embodiment of the present invention.

Referring now to FIG. 11, a screen shot of the action properties for an EnterString action 815 in accordance with an embodiment of the present invention is illustrated. The EnterString action 815 allows a string to be entered as if it were entered on the keyboard. This saves effort in entering the string one key at a time. An optional <enter> key press can be executed after the string if necessary. This action is useful for broadcasting pre-generated messages such as "Cover me." The string to be entered is typed into the String box 1105. The case of each letter entered is preserved. Depending on the speed of the computer and the responsiveness of the game, a short delay is sometimes necessary between each character. The delay that the program should wait between each character in the string is entered in milliseconds in the Character delay box 1110. If an <enter> key is necessary after the string is entered the Hit enter box 1115 is checked.

Figure 12:
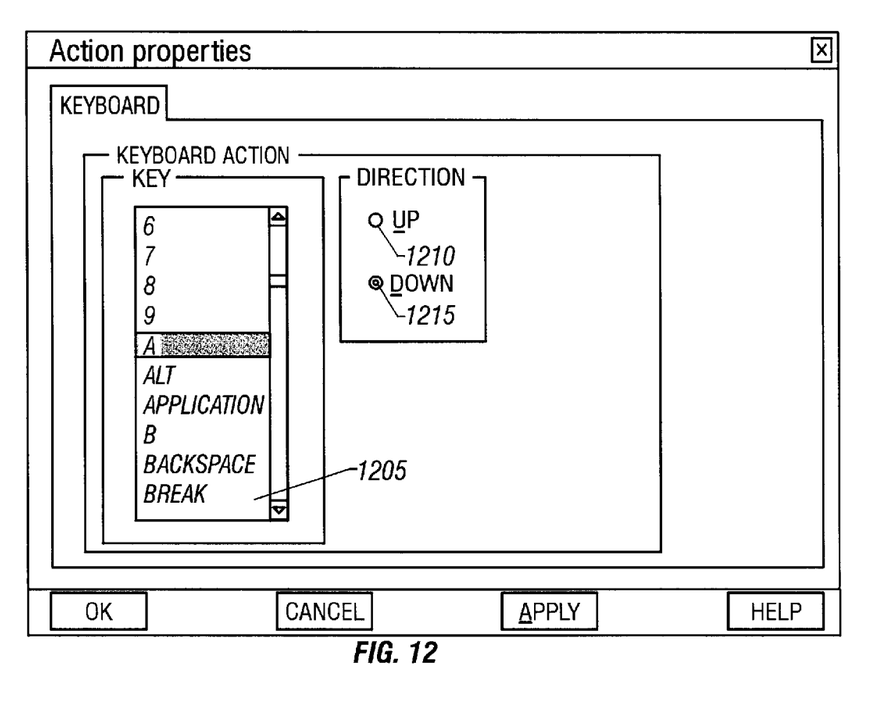
FIG. 12 is a screen shot of the action properties for the Keyboard action in accordance with an embodiment of the present invention.

Referring now to FIG. 12, a screen shot of the action properties for the Keyboard action 820 in accordance with an embodiment of the present invention is illustrated. The key section 1205 contains a list of all the keys on the keyboard that may be selected in a keyboard action. A keyboard action simulates keyboard key presses or releases. Any key can be put into the down state or the up state. The user usually selects a key from the block 1205 to be associated with this action. For alphanumeric keys, the real key on the keyboard can be pressed to jump to that key in the list. The keys are listed in alphabetical order. The direction of the key can be selected by clicking the Up selection 1210 to simulate a release or the Down selection 1215 to simulate a key press of the selected key. The key will remain in the down state until an action is executed that puts it back into the up state.

Figure 13:
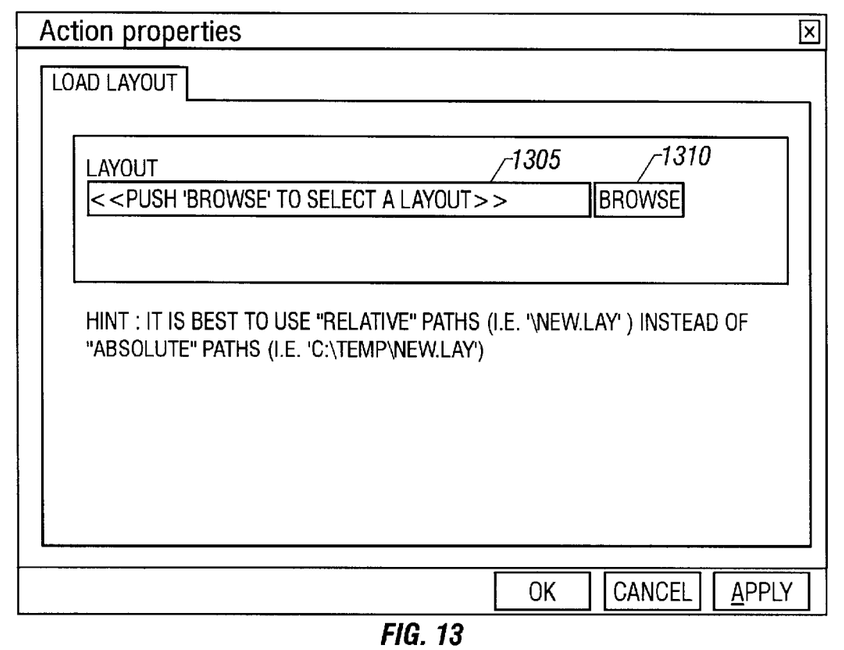
FIG. 13 is a screen shot of the action properties for the LoadLayout action in accordance with an embodiment of the present invention.

Referring now to FIG. 13, a screen shot of the action properties for the LoadLayout action 825 in accordance with an embodiment of the present invention is illustrated. If there are too many controls/graphics to fit on one page, this option is used to implement a multi-screen setup. It can also be used to implement a generic layout navigator. The layout box 1305 displays the currently selected layout. To choose another layout, the user selects the browse button 1310 to browse for another layout to be loaded.

Figure 14:
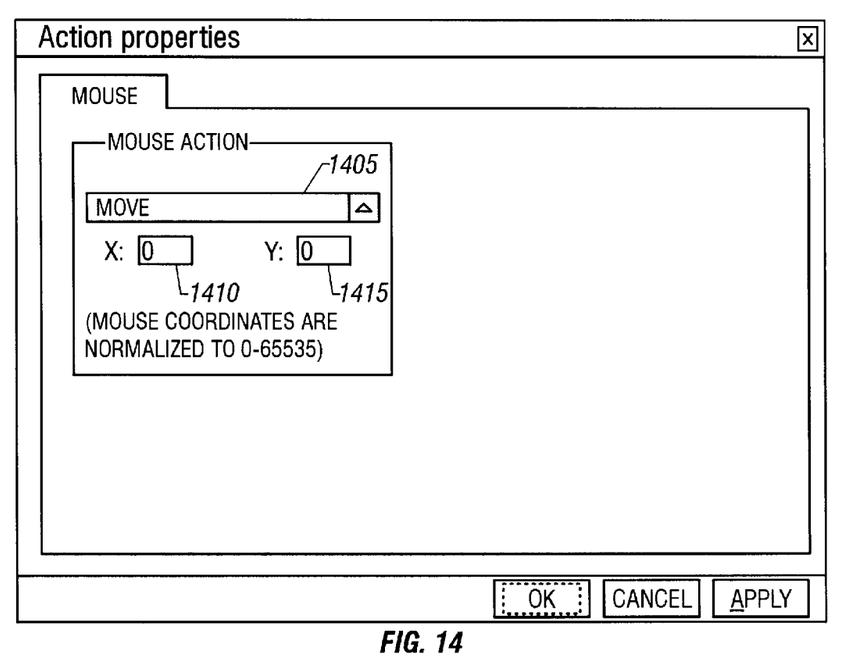
FIG. 14 is a screen shot of the action properties for a Mouse action in accordance with an embodiment of the present invention.

Referring now to FIG. 14, the action properties for a Mouse action 830 in accordance with an embodiment of the present invention is illustrated. A mouse action simulates a mouse movement or button click. As with the keyboard, the mouse buttons will remain in the last executed position whether it is up or down. The mouse action type block 1405 is used to select the desired mouse action. Left, middle, or right mouse button events can be simulated as well as mouse movement. The X coordinate 1410 specifies the horizontal coordinate when a mouse movement is selected in block 1405. The coordinates are normalized to 0 to 65535. This means that a coordinate of 0 will map to the left side of the screen and a coordinate of 65535 will map to the right side of the screen. The Y coordinate 1415 specifies the vertical coordinate for a mouse movement. The Y coordinate is also normalized to 0 to 65535. Thus, 0 is mapped to the top of the screen and 65535 is mapped to the bottom of the screen.

Figure 15:
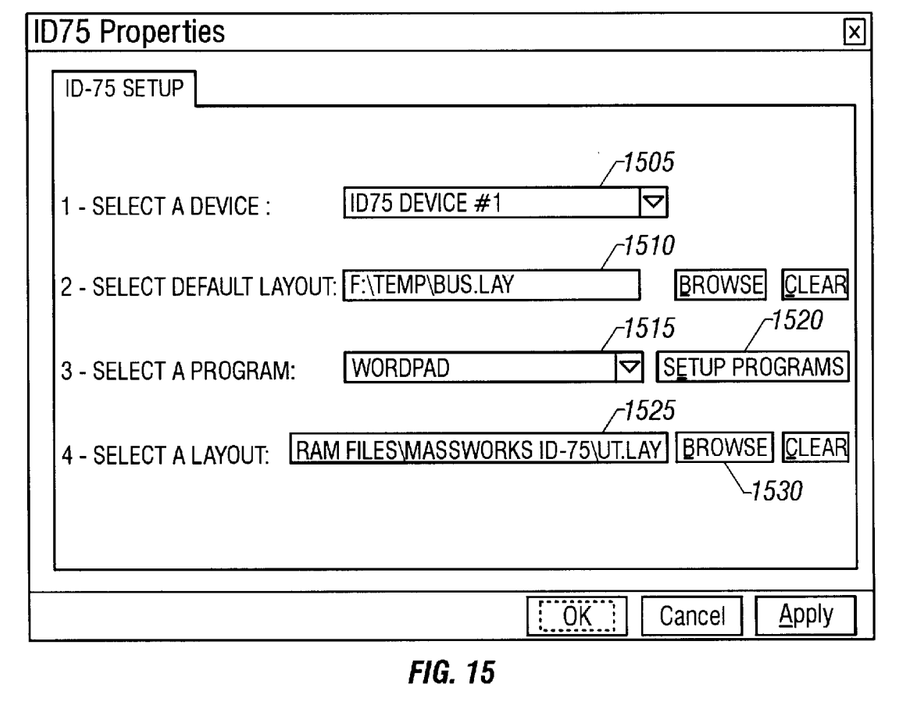
FIG. 15 is a screen shot of the setup window for the game controller in accordance with an embodiment of the present invention.

Referring now to FIG. 15, a screen shot of the setup window for the game controller 105 is illustrated. The Select a device block 1505 is used to select the controller to be setup. Multiple controllers can be connected to the same computer. The desired devices must be on and plugged in for them to be listed in this area. The Select default layout block 1510 is used to specify the layout that will be loaded into the controller if the application tracker does not recognize the active application. The Select a program block 1515 is used to select a program or game application that is to be associated with a layout file. The Setup programs button 1520 is used to setup the program shortcuts so that the control software can determine what application is running. This button is used to setup a list of known programs. The Select a layout block 1525 is used to display the current layout associated with the application selected in the Select a program block 1515. The Browse button 1530 is used to browse the layout files for a particular layout to be associated with the program selected in block 1515.

Figure 16:
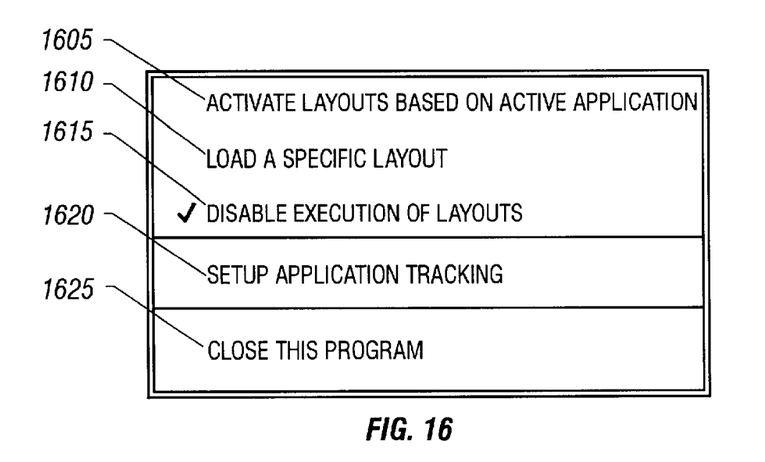
FIG. 16 is a screen shot of the options available for the control software in accordance with an embodiment of the present invention.

Referring now to FIG. 16, a screen shot of the options available for the control software is illustrated. The control software tracks the active application and loads the appropriate layout. The control software also shows up as an icon in the systems tray (the area on the start bar that contains the time). Right clicking on the icon will bring up the window shown in FIG. 16. By default, the control software is placed in the startup folder in the start menu so that it is executed whenever the operating systems boots. To avoid automatic startup, the user may delete the shortcut from the startup programs group. When the Activate layouts based on active application option 1605 is selected, the control software will track the active application and load the appropriate layout. The user may also select the Load a specific layout option 1610 to download a specific layout into the controller. This layout will then be used until it is changed by the user. The Setup application tracking option 1620 allows setup of links from the application to the layouts. The links are used during application tracking to determine which layouts to load. The Close this program option 1625 closes the control program for the duration of the Windows session.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A customizable input device for a computer, said customizable input device comprising:
   a display device for displaying images;
   a touchscreen device for receiving inputs from a user;
   a microcontroller connected to said display device and said touchscreen device for loading a plurality of images into said display device and receiving inputs from said touchscreen device wherein said microcontroller is configured to receive a plurality of image files from said computer and wherein said microcontroller is configured to transmit an input from said user to said computer based on an area of said touchscreen device that is activated by said user wherein said input corresponds to a user-defined action to be executed by said computer; and an interface connected to said microcontroller adapted for communicating with said computer;

wherein said customizable input device is adaptable for use with a plurality of applications on said computer wherein said user may customize said plurality of images for each of said plurality of applications.

2. The apparatus of claim 1 wherein said touchscreen device is a transparent touchscreen overlay.

3. The apparatus of claim 2 wherein said touchscreen device and said display device are integrally connected such that said touchscreen device overlays said display device.

4. The apparatus of claim 1 wherein said interface is a serial cable adapted for connecting said microcontroller to a uniform serial bus on said computer.

5. The apparatus of claim 1 wherein said plurality of images are displayed using a plurality of bitmaps files.

6. A computer system with an input device for controlling an application program running on said computer system, said computer system comprising:

a computer for running said application program;

a display device for displaying a plurality of images received from said computer;

a touchscreen device for allowing a user to control said application program wherein said touchscreen device overlays said display device;

a microcontroller connected to said display device and said touchscreen device for interfacing with said computer wherein said microcontroller loads said plurality of images onto said display device and transmits inputs from said touchscreen device to said computer;

an interface connecting said computer and said microcontroller for allowing said computer to communicate with said input device; and a memory means for storing said plurality of images and for storing a table associating a user-defined action with an input area on said touchscreen device wherein said computer retrieves said user-defined action from said memory means and executes said user-defined action when said input area is activated by said user;

wherein said customizable input device is adaptable for use with a plurality of applications on said computer wherein said user may customize said plurality of images for each of said plurality of applications.

7. The computer system of claim 6 further comprising:

a touchscreen interface connected between said microcontroller and said touchscreen device for allowing said microcontroller to receive inputs from said touchscreen device;

a video driver connected between said microcontroller and said display device for allowing said microcontroller to display said plurality of images on said display device; and a video memory device connected to said video driver for storing image data.

8. The computer system of claim 6 wherein said memory means comprises a layout file.

9. The computer system of claim 8 further comprising a layout editor for editing said layout file wherein said layout editor allows said user to choose and arrange said plurality of images as they are to be displayed on said display device and wherein said layout editor allows said user to associate a user-defined action with at least one of said plurality of images.

10. The computer system of claim 9 wherein said input area on said touchscreen device overlays one of said plurality of images displayed on said display device.

11. The computer system of claim 6 wherein said user-defined action comprises a plurality of actions.

12. The computer system of claim 6 wherein said interface is a serial cable connected to a uniform serial bus on said computer.

13. The computer system of claim 6 wherein said touchscreen device is transparent and said display device is integrally connected to said touchscreen device such that said touchscreen device overlays said display device.

14. The computer system of claim 13 wherein said display device is a liquid crystal display and wherein said touchscreen device is a passive resistive touch sensitive panel.

15. The computer system of claim 6 wherein said computer is a personal computer using a Windows operating system.

16. The computer system of claim 6 wherein said application program is a game.

17. A computer system with an input device for controlling an application program running on said computer system, said computer system comprising:

a computer for running said application program;

a display device for displaying a plurality of images received from said computer;

a touchscreen device for allowing a user to control said application program wherein said touchscreen device overlays said display device;

a microcontroller connected to said display device and said touchscreen device for interfacing with said computer wherein said microcontroller loads said plurality of images onto said display device and transmits inputs from said touchscreen device to said computer;

an interface connecting said computer and said microcontroller for allowing said computer to communicate with said input device; and a memory means for storing said plurality of images and for storing a table associating a user-defined action with an input area on said touchscreen device wherein said computer retrieves said user-defined action from said memory means and executes said user-defined action when said input area is activated by said user;

wherein said user-defined action comprises an action selected from the group consisting of a delay, an external call of a dynamic link library, a string entry, a keyboard entry, a load of a layout, a mouse input, and an opening of a uniform resource locator;

wherein said customizable input device is adaptable for use with a plurality of applications on said computer wherein said user may customize said plurality of images for each of said plurality of applications.

18. A computer system with an input device for controlling an application program running on said computer system, said computer system comprising:

a computer for running said application program;

a display device for displaying a plurality of images received from said computer;

a touchscreen device for allowing a user to control said application program wherein said touchscreen device overlays said display device;

a microcontroller connected to said display device and said touchscreen device for interfacing with said computer wherein said microcontroller loads said plurality of images onto said display device and transmits inputs from said touchscreen device to said computer;

an interface connecting said computer and said microcontroller for allowing said computer to communicate with said input device; and a memory means for storing said plurality of images and for storing a table associating a user-defined action with an input area on said touchscreen device wherein said computer retrieves said user-defined action from said memory means and executes said user-defined action when said input area is activated by said user;

wherein said user-defined action comprises a plurality of actions; and wherein said plurality of actions are chosen from the group consisting of a delay, a dynamic link library call, a string entry, a keyboard entry, a load of a layout, a mouse input, and an opening of a uniform resource locator;

wherein said customizable input device is adaptable for use with a plurality of applications on said computer wherein said user may customize said plurality of images for each of said plurality of applications.

19. A method for controlling an application program running on a computer system, said method comprising:

downloading a layout file to an input device;

displaying an image from said layout file on said input device using a display device;

sensing inputs from a user on said input device wherein said inputs are sensed using a touchscreen panel;

responsive to sensing an input by said user in a bounding region on said touchscreen panel, determining a user-defined action associated with said bounding region using said layout file; and responsive to determining a user-defined action, performing said user-defined action;

wherein said customizable input device is adaptable for use with a plurality of applications on said computer wherein said user may customize said plurality of images for each of said plurality of applications.

20. The method of claim 19 further comprising:

monitoring for a second application program becoming an active program; and responsive to said second application program becoming said active program, downloading a second layout file to said input device such that said second layout file is substituted for said layout file.

21. The method of claim 19 further comprising downloading an updated layout file to said input device when said layout file is modified.

22. The method of claim 19 wherein said application program is a game.

23. The method of claim 19 wherein a plurality of layout files are stored on said computer system for use with a plurality of application programs.

24. A computer program product in a computer readable medium for controlling an application program running on a computer system, said computer program product comprising:

first instructions for downloading a layout file to an input device;

second instructions for displaying an image from said layout file on said input device using a display device;

third instructions for sensing inputs from a user on said input device wherein said inputs are sensed using a touchscreen panel;

fourth instructions, responsive to sensing an input by said user in a bounding region on said touchscreen panel, for determining a user-defined action associated with said bounding region using said layout file; and fifth instructions, responsive to determining a user-defined action, for performing said user-defined action;

wherein said customizable input device is adaptable for use with a plurality of applications on said computer wherein said user may customize said plurality of images for each of said plurality of applications.

25. The computer program product of claim 24 further comprising:

instructions for monitoring for a second application program becoming an active program; and instructions, responsive to said second application program becoming said active program, for downloading a second layout file to said input device such that said second layout file is substituted for said layout file.

26. The computer program product of claim 24 further comprising instructions for downloading an updated layout file to said input device when said layout file is modified.

* * * * *

UNITED STATES PATENT AND TRADEMARK OFFICE
CERTIFICATE OF CORRECTION

PATENT NO. : 6,738,049 B2
DATED : May 18, 2004
INVENTOR(S) : Willie C. Kiser et al.

It is certified that error appears in the above-identified patent and that said Letters Patent is hereby corrected as shown below:

Column 9,
Line 25, after "images are displayed using a plurality of", please change "bitmaps" to -- bitmap --.

Signed and Sealed this

Eighteenth Day of January, 2005

JON W. DUDAS
*Director of the United States Patent and Trademark Office*